C. M. COTT.
INDEX.
APPLICATION FILED APR. 11, 1922.

1,437,168.  Patented Nov. 28, 1922.
2 SHEETS—SHEET 1.

| FREQUENTLY OCCURRING FAMILY NAMES  15 | | | | | | | KEY TABLE for MIXED NAMES TO WHICH REFER IF NAME IS NOT FOUND IN RULES SPACES TO LEFT | | |
|---|---|---|---|---|---|---|---|---|---|
| AND PAGES OF THIS BOOK ON WHICH THEY ARE INDEXED | | | | | | | | | |
| LOOK FOR NAME IN RULED SPACES BELOW IN PROPER RED ALPHABET DIVISION | | | | | | | | | |
| SEARCH | PAGE | THESE | PAGE | NAMES | PAGE | FIRST | PAGE | ALPHABET DIVISIONS | KEY TABLE | PAGE |
| | | | | | | Atkinson | 147 | 13 | Aa to Ak | 1 |
| | | | | | | Archer | 151 | | Al - - - | 3 |
| | | 8 | 5 | | | Allen-Allyn | 163 | A | Am An Ap-q | 5 |
| | | | | | | Anderson | 165 | | Ar As - - | 7 |
| | | | | | | Adamson | 167 | | At to Az | 9 |
| | | | | | | Adkins | 169 | 12 | 10 | |
| | | | | 6 | | Adams-Addams | 185 | | | 14 |
| | | | | | | Baugh | 135 | Ba | Baa to Bam | 11 |
| | | | | | | | | | Ban to Bar | 13 |
| | | 7 | | Baker | 187 | Bass | 139 | | Bas to Baz | 15 |
| | | | | Beall | 197 | Bentley | 161 | Be | Bea to Bel | 17 |
| | | | | Bell | 197 | Bailey-Baley | 175 | | Bem to Bez | 19 |
| | | | | | | | | Bi | Bia to Bil | 17 |
| | | | | | | | | | Bim to Biz | 19 |
| | | | | | | | | Bl | Bl - - - | 21 |
| | | | | Burke | 203 | Bonfant | 131 | | Boa to Bol | 21 |
| | | | | Burton | 181 | Brown | 99 | Bo | Bom to Bor | 25 |
| 9 | | | | Bowles | 183 | Briant | 49 | Br | Bos to Boz | 27 |
| | | | | Bradley | 195 | Booker | 143 | | Bra - - - | 29 |
| | | | | Blanton | 199 | Brackett | 159 | Bu | Bre-Bri-Bry | 31 |
| | | | | | | | | | Bro - - | 33 |
| | | | | | | | | By | Bru - - | 35 |
| | | | | | | | | | Bu By | 37 |
| | | | | | | | | | B-odd | 37 |
| | | | | | | | | Ca | Caa to Cam | 39 |
| | | | | | | Clark(e) | 119 | Ce | Can to Car | 41 |
| | | 7 | | Chaffin | 155 | Canaby | 123 | | Cas to Caz | 43 |
| | | | | Clement | 179 | Cordoza | 111 | Ch | Ce Ch Ci | 45 |
| | | | | Clements | 179 | Campbell | 151 | Ci | Churches | 47 |
| | | | | Carrington | 191 | Carter | 189 | Cl | Ci - - - | 49 |
| | | | | | | | | Co | Coa to Col | 51 |
| | | | | Crawford | 173 | Coleman | 171 | | Com Con Coo | 53 |
| | | | | Cook-Cooke | 201 | Crump | 115 | Cr | Cop to Coz | 55 |
| | | | | Crowder | 125 | Cosby | 123 | | Cra-Cre-Cri-y | 57 |
| | | | | | | Cox(e) | 127 | Cu | Cro-Cru - | 59 |
| | | | | | | | | | Cu-Cy - - | 61 |
| | | | | | | | | Cy | C-odd | 61 |
| | | | | | | | | Da | Daa to Dap | 63 |
| | | | | | | Dance | 97 | | Dar to Daz | 65 |
| | | 9 | | Denson | 177 | | | | Dea to Dem | 67 |
| | | | | Davis | 133 | | | De | Den to Dez | 69 |
| | | | | Dean-Deane | 193 | | | | Dia to Dim | 67 |
| | | | | Dabney | 139 | | | Di | Din to Diz | 69 |
| | | | | | | | | Do | Doa Don | 71 |
| | | | | | | Dorset-Dorsett | 167 | | Doo to Doz | 73 |
| | | | | | | | | Dr | Dr - - - | 75 |
| | | | | | | | | | Du - - - | 77 |
| | | | | | | Dupuy-Dupie | 185 | Du | Dw-Dy - - | 79 |
| | | | | | | | | Dw | D-odd- | 79 |
| | | | | | | Drake | 155 | Dy | C & F 81-89 | |

Fig. 1

Inventor
Charles M. Cott,

By Shepherd Campbell
Attorney

C. M. COTT.
INDEX.
APPLICATION FILED APR. 11, 1922.

1,437,168.

Patented Nov. 28, 1922.

| SEARCH | PAGE | THESE | PAGE | NAMES | PAGE | FIRST | PAGE | ALPHABET DIVISIONS | FIRST VOWEL | PAGE |
|---|---|---|---|---|---|---|---|---|---|---|
| | | | | | | | | GIVEN NAME INITIAL | a --- | 1 |
| | | | | | | Brown | 75 | A | e --- | 3 |
| | | | | | | | 12→ | | i, y } --- | 5 |
| | | | | 5 | | | | B | o --- | 7 |
| | | | | | | Butler | 97 | C | u & no vowel | 9 |
| | | -8 | | | 6 | 13ᵃ | | | a --- | 11 |
| | | | | | | Brown | 77 | D | e --- 10 | 13 |
| | | | | | | Barnett | 71 | | i, y } --- | 15 |
| | | 7 | | | | | | E | o --- | 17 |
| | | | | | | Baker | 89 | F | u & no vowel | 19 — 14 |
| | | | | | | Butler | 97 | | | |
| | | | | | | Brown | 79 | G | a --- | 21 |
| | | | | | | | | 13 | e --- | 23 |
| | | | | | | Baker | 89 | H | i, y } --- | 25 |
| | | | | | | 9 | | | o --- | 27 |
| | | | | | | Butler | 97 | I | u & no vowel | 29 |
| 9 | | | | | | Brown | 81 | J | a --- | 31 |
| | | | | | | | | | e --- | 33 |
| | | | | | | Baker | 91 | K | i, y } --- | 35 |
| | | | | | | Burgess | 73 | | o --- | 37 |
| | | | | | | Butler | 97 | L | u & no vowel | 39 |
| | | | | | | Brown | 83 | M | a --- | 41 |
| | | | | | | | | | e --- | 43 |
| | | | | | | | | | i, y } --- | 45 |
| | | | | | | Baker | 93 | N-O | o --- | 47 |
| | | | | | | Butler | 97 | P-Q | u & no vowel | 49 |
| | | | | | | Brown | 85 | R | a --- | 51 |
| | | | | | | | | | e --- | 53 |
| | | | | | | | | | i, y } --- | 55 |
| | | | | | | Baker | 95 | S | o --- | 57 |
| | | | | | | Butler | 97 | T | u & no vowel | 59 |
| | | | | | | | | U-V | a --- | 61 |
| | | | | | | Brown | 87 | | e --- | 63 |
| | | | | | | | | | i, y } --- | 65 |
| | | | | | | Butler | 97 | W | o --- | 67 |
| | | | | | | | | X-Y-Z | u & no vowel | 69 |

Fig. 2.

Inventor
Charles M. Cott,
By Shepherd Campbell
Attorney

Patented Nov. 28, 1922.

1,437,168

UNITED STATES PATENT OFFICE.

CHARLES M. COTT, OF RICHMOND, VIRGINIA, ASSIGNOR TO COTT PRINTING & INDEX COMPANY, OF COLUMBUS, OHIO, A CORPORATION OF OHIO.

INDEX.

Application filed April 11, 1922. Serial No. 551,539.

*To all whom it may concern:*

Be it known that I, CHARLES M. COTT, a citizen of the United States, residing at Richmond, in the county of Henrico and State of Virginia, have invented certain new and useful Improvements in Indexes, of which the following is a specification, reference being had therein to the accompanying drawings.

This invention relates to an index and more particularly to an index for public records, and it has for its object to provide an improved article of this nature arranged in such manner as to conserve space and to keep the number of record books down to the minimum number for a given number of names and, additionally, to render it possible to locate any desired name, with certainty and with a minimum amount of work on the part of the searcher.

Further objects and advantages of the invention will be set forth in the detailed description which follows.

In the indexing of public records it is common practice to provide a volume separate from the deed books proper and which volume constitutes indexes for such deed books, and where the number of names indexed are in such number as to render it necessary, there may be a number of volumes constituting the complete index and each of these volumes, termed a unit of the index, takes care of a given number of letters of the alphabet. The leaves of these indexes are mounted in loose leaf binders so that the indexes may be sub-divided as occasion requires and so that ultimately, if the extent of the index justifies it, each letter of the alphabet will have a volume devoted to it.

In the accompanying drawings:

Fig. 1 represents one of the pages of such a unit of an index taking care of the letters from A to D and the matter shown upon this page constitutes a sub-index by means of which the searcher may be quickly and accurately directed to that page of the unit proper containing the name and the data relating to the name for which he may be searching.

Fig. 2 represents an indexing unit showing a modified arrangement.

In carrying out the invention I provide horizontal ruling or lines 5 for the reception of names to be entered therein and at intervals provide heavier lines 6 or other suitable division means by which the sheet as a whole is divided into a plurality of horizontal sections 7. These horizontal sections are, in turn, divided by vertical ruling 8 into a plurality of vertical columns 9, intended to receive frequently occurring family names and an additional vertical column 10 intended to receive a mixed name page index, indicated at 11, said mixed names being those which are not of frequent occurrence. The vertical columns 9 are separated from each other by "Page" columns 12 which receive the numbers of the pages upon which the names entered in said columns are to be found indexed. The right-hand column 12 is separated from the column 10 by a column 13 in which letters of the alphabet are entered, as shown; these letters in Fig. 1 consisting of the first letters of the surnames, while in Fig. 2 they consist of the first letters of the given names, the index 11 constituting a further sub-division of such names, as presently set forth. A column 14 receives the page numbers upon which the names indexed in accordance with the index 11 will be found.

A primary purpose of the present invention is to enable the searcher to get the information sought with the least possible trouble. To this end the columns 9 are, as a whole, headed by descriptive matter 15 directing the searcher how to proceed and in these columns 9 those names are entered which experience has shown are of frequent occurrence. For example, if experience has shown that the name Anderson is one of frequent occurrence this name is entered at once in one of the columns 9 and in the horizontal section indicated by its initial letter A in column 13 and it is given a page number, in this case 165. Thus when the searcher turns to page 165 he will find all of the Andersons indexed together. Furthermore this arrangement renders it possible to bring all names having the same sound, but spelled differently, together. For example, such names as Allen-Allyn may be given the same page number and thus the searcher will be assured that he will find upon page 163 all names of this general character though they may be spelled in various ways. The names are entered in the right-hand column 9, first and then overflow into the columns 9 to the left as need arises. In like manner the name Baker, for example, would be entered in the section 7 in the spaces designated by the initial letters Ba in column 13 and in the first column to the left of said column 13 in which an unoccupied space occurred.

If the name is one that is not of frequent occurrence then it is not indexed in columns 9 but is indexed according to mixed name index 11. If, for example, the name is Aldyce the mixed named page index shows that it will be indexed upon page 3 of the index. Thus with respect to names of infrequent occurrence, such names do not have whole pages devoted to them but are given space only as they occur and on the mixed name page to which they are assigned. This results in conserving space to a vast degree because it renders unnecessary the devoting of whole pages to names which occur but infrequently. If, in making a search, the searcher follows the directions given and searches those names in columns 9 first and he finds the name for which he is searching in those columns he may be assured of finding all like names in the same place. If, for example, he is searching for the name Adams and he finds the name Adams in one of the columns 9 he is saved the trouble of going any further because he knows that on page 185 he will find all the names of this kind and it is not necessary for him to search through a large variety of names as would be the case if all names of a group were together whether frequent or infrequent and if he had to go to the mixed name page index to locate it. Thus in most instances the searcher has to go no further than an examination of the names located for him in columns 9.

In Fig. 2 the whole page is devoted to a letter of the alphabet, in this case B. The invention in the main is the same as in Fig. 1 but in this case the letters in column 13ª relate to given names instead of surnames, while the tables 11 relate to the surnames. Thus, for example, the name John Brown will be indexed on page 81 and all J. Browns will appear on that page. If the name Brown occurs frequently and it is to be entered in a section 7 it will be entered in the first unoccupied space to the left controlled by the letter J. In making a search with this index, the searcher reads from left to right in the usual way and he comes first to that matter which, in accordance with the plan, he should search first, and if the name is not found there his eye travels naturally to the next place where he must search; thus all the data necessary to make a complete search in any case is brought into one compact, horizontal division, where the eye can travel over it naturally in reading from left to right. The result is that a search may be made in minimum time and that the chance of error is greatly diminished.

It is to be understood that the invention is not limited to the precise arrangement and the lettering set forth, but that it includes within its purview whatever changes fairly come within either the terms or the spirit of the appended claims.

Having described my invention what I claim is:

1. An index comprising a section for the immediate reception of names of frequent occurrence and a sub-index for names of infrequent occurrence, said sub-index being disposed to the right of and adjacent to the first named section.

2. An index of the character described comprising a page ruled to provide a plurality of horizontal sections, the left-hand portion of each of said sections being arranged to constitute a sub-index for the immediate reception of names of frequent occurrence and the right-hand portion of said section containing matter constituting a sub-index for names of infrequent occurrence.

3. An index as recited in claim 2 wherein said last named sub-index consists of main alphabetical designations at the left of the sub-index and a plurality of more specific alphabetical designations to the right thereof, a page column being provided to the right of the last named designations for the reception of page numbers.

4. An index comprising a section for the immediate reception of names of frequent occurrence and a sub-index associated therewith for subdividing names of infrequent occurrence and designating their place of entry at another page.

In testimony whereof I hereunto affix my signature.

CHARLES M. COTT.